Feb. 12, 1957  F. G. LESNIAK ET AL  2,781,137
SELF UNLOADING APPARATUS
Filed March 10, 1952  4 Sheets-Sheet 1

INVENTOR
FRANK G. LESNIAK
WALTER A. STUBBE
BY
ATTORNEY

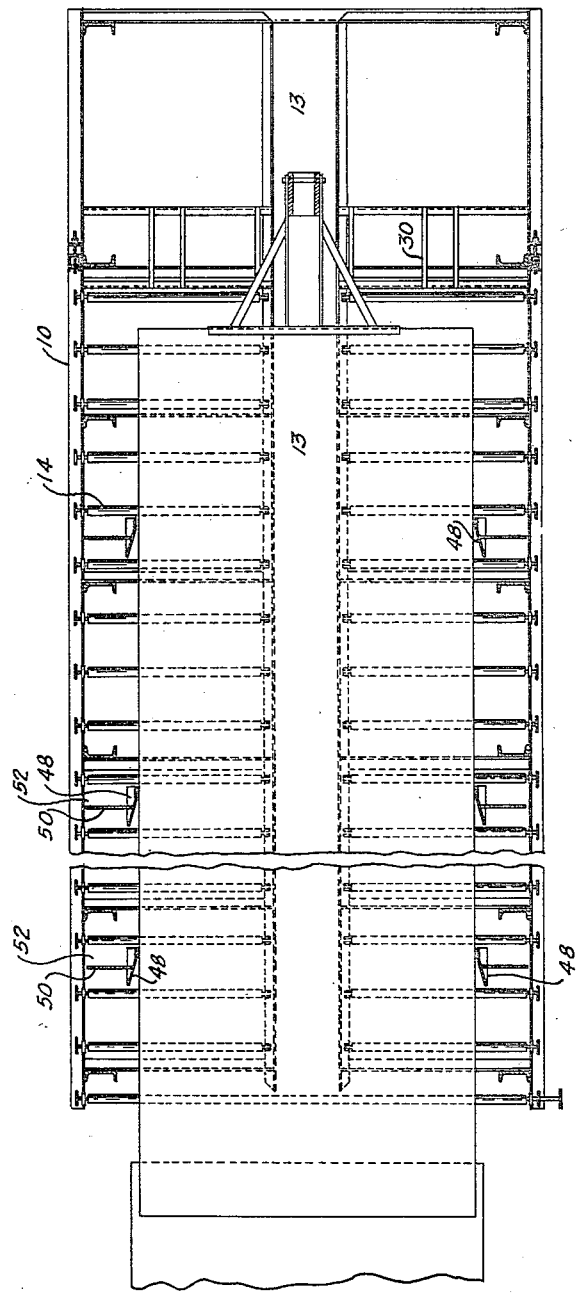

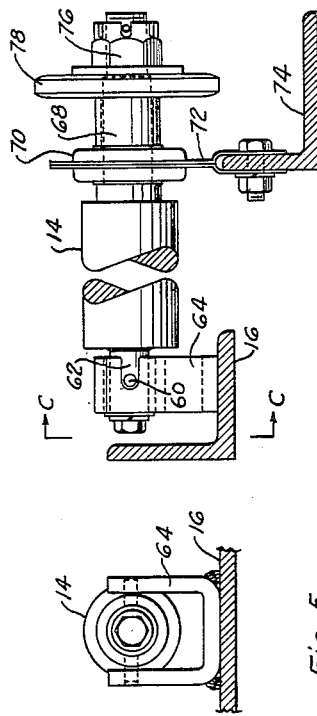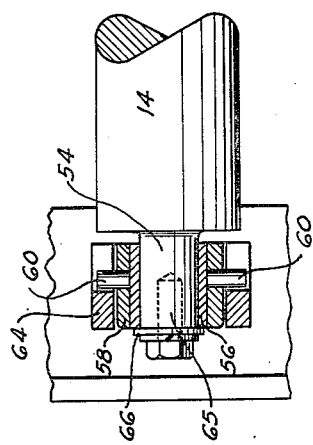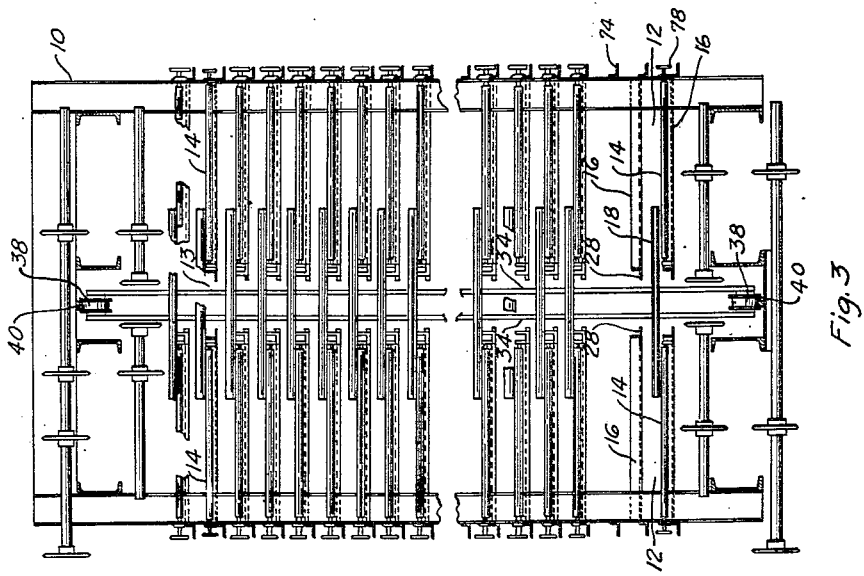

INVENTOR
FRANK G. LESNIAK
WALTER A. STUBBE
BY
ATTORNEY

United States Patent Office 2,781,137
Patented Feb. 12, 1957

2,781,137

SELF UNLOADING APPARATUS

Frank G. Lesniak and Walter A. Stubbe, Laurel, Miss., assignors to Masonite Corporation, Laurel, Miss., a corporation of Delaware Application March 10, 1952, Serial No. 275,796

4 Claims. (Cl. 214—16.6)

This invention relates to a movable self-loading and unloading rack for handling a plurality of sheets. More particularly, the invention relates to an improvement in apparatus for the simultaneous loading of multiple-platen hydraulic presses with sheets to be pressed.

The improved apparatus of the invention is particularly suitable for handling a plurality of self-supporting sheets which are to be charged into a multiple-platen press wherein they are subjected to elevated temperature and pressure and thus consolidated into rigid sheets. The apparatus is well adapted, for example, for use in the manufacture of hardboards of lignocellulose fiber made according to U. S. Patent No. 2,120,137 to W. H. Mason, such boards being made from self-supporting blanks and having smooth surfaces at each face after pressing by reason of being pressed directly against the press platens or against surface plates applied to the platens.

In the past, such self-supporting sheets for blanks have been charged into the press openings by pushing them individually and manually from behind. Difficulties are encountered with this type of press loading inasmuch as the press platens are heated quite high, as for example over 200° C. Since the manual press loading is ordinarily commenced at the bottom press opening and carried on progressively to the top, the blanks are exposed to the press platen heat for varying periods of time which is incompatible with securing the greatest uniformity of product. More recently, mechanical press loading apparati have been developed for the simultaneous charging of a plurality of blanks into a multiple-platen press. One of the most desirable of these mechanical devices is described and claimed in U. S. Patent No. 2,438,896. The mechanical press-loading and unloading apparatus of this patent is equipped with sheet pushing and gripping members which are adapted to load the blanks into the press openings and, subsequent to the pressing operation, to grip the consolidated boards and withdraw them simultaneously from the press. The self-loading and unloading rack of the present invention represents a substantial improvement over the above described apparatus.

It is an object of the present invention to speed up the production of fiber board products made from self-supporting blanks by providing a self-loading and unloading rack. It is a further object of the present invention to prevent or reduce the necessity for manual alignment of the sheets within the press platen openings. Another object of the invention resides in the provision of a rack so constructed as to prevent breakage of the blanks prior to their delivery into the press openings.

The preferred apparatus of the invention comprises a rack so constructed as to provide a plurality of paired compartments one over another, each pair of compartments being adapted for receiving and supporting one of the sheets of material to be pressed. The paired compartment spacings are in substantially the same position as the numerous open spacings between platens of the hydraulic press in which the sheets are to be pressed. Thus, upon the rack being stationed in front of an opened, multiple-platen press, the rack compartments are in substantially horizontal alignment with the openings between the press platens. The rack is provided with a plurality of sheet-supporting rolls which are adapted to be simultaneously rotated and by means thereof to deliver into the rack a plurality of self-supporting blanks. The sheet-supporting rolls are oppositely disposed, extending from the sides of the rack toward the center, i. e. substantially at right angles to the longitudinal axis of the machine, but terminating short thereof to provide an open central space extending the height and length of the rack. The rack is also equipped with pushing members which may engage the end of a sheet thus providing means for pushing the sheet material out of the rack compartments and into the press openings. The sheet-supporting rolls are synchronously actuated during the rack-unloading procedure thus assisting in the removal of the sheets therefrom and into the multiple-platen press.

The structure and purpose of the improved apparatus of the present invention may be more easily understood from the following description of the preferred embodiment shown in the accompanying drawings in which Fig. 1 is a diagrammatic side elevation of a rack;

Fig. 2 is a diagrammatic horizontal sectional view through section B—B of Fig. 1, of a rack, showing a blank in the course of delivery to a press;

Fig. 3 is a vertical section substantially through section A—A of Fig. 1;

Fig. 4 is a side elevation of a roll bearing and housing assembly;

Fig. 5 is an end elevation through section C—C of Fig. 4;

Fig. 6 is a top plan view, partially in section, of Fig. 4;

Figure 1:
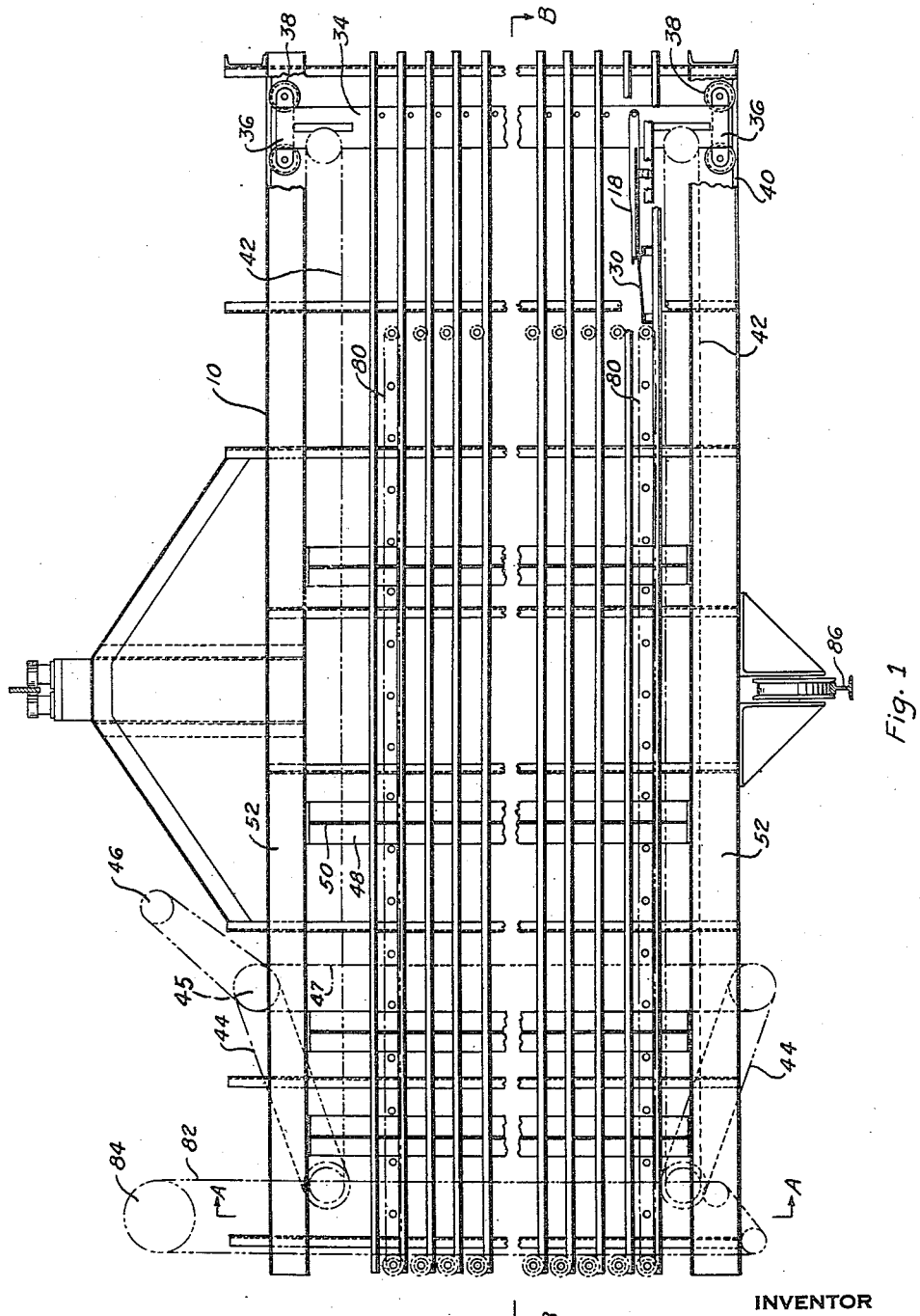
Figure 7:
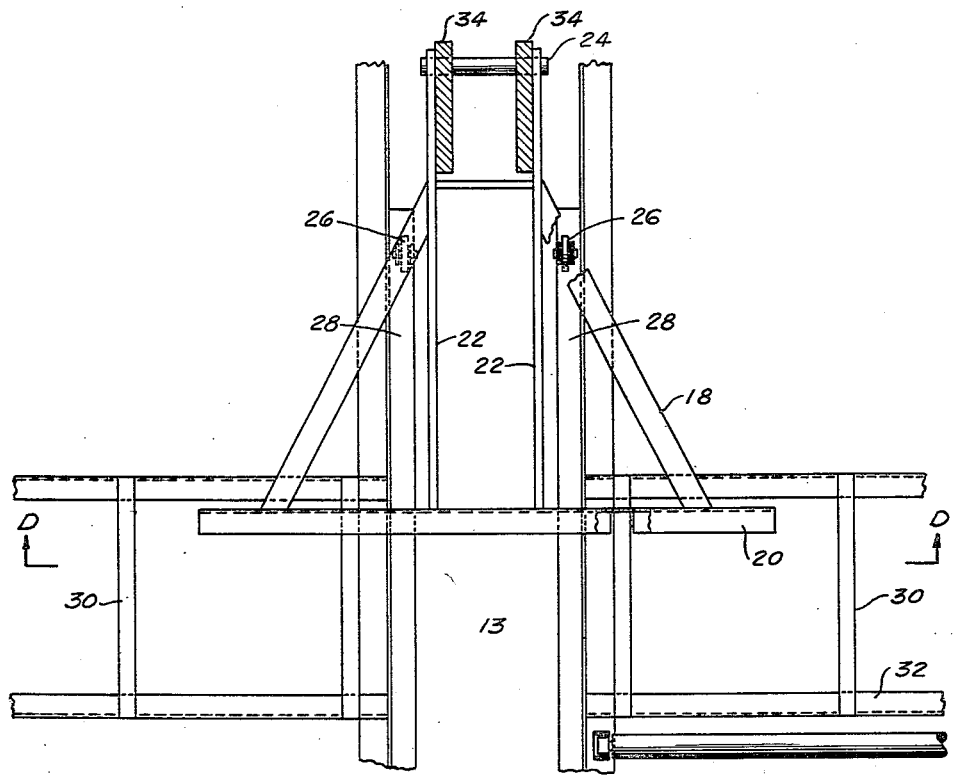
Fig. 7 is a fragmentary horizontal section showing a sheet pusher member.
Figure 8:
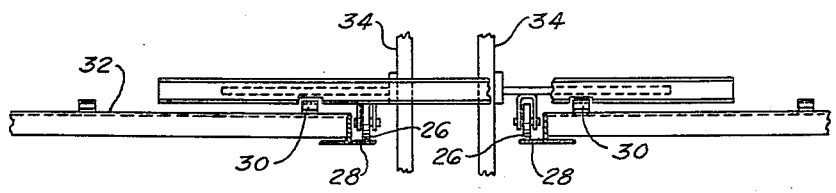
Fig. 8 is a fragmentary end elevation through section D—D of Fig. 7.
Figure 9:
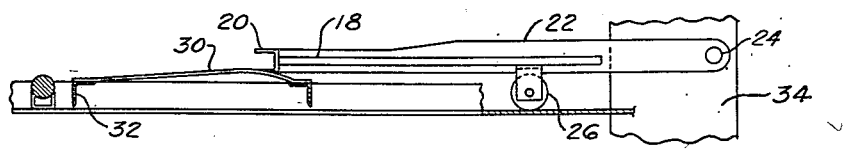
Fig. 9 is a side elevation of Fig. 7.

The rack in its preferred form is designated by the reference character 10. Said rack 10 is divided into a plurality of pairs of oppositely positioned compartments 12 by means of the cantilever roll supporting members 16. Sheet supporting rolls 14 extend from the sides of the rack 10 into the compartments 12 and are supported therein by the members 16. The paired compartments 12 terminate short of the center of the rack, i. e. short of the longitudinal axis thereof, and provide, contiguous thereto, the central opening 13 which extends the height and length of the rack. The paired compartments 12 are disposed in substantially vertical alignment and the filling of the rack is effected by the introduction of a single sheet into each pair of said compartments.

Within each pair of compartments 12 or extending therefrom is a sheet pusher member 18 having a substantially U-shaped edge 20 which is adapted to receive the leading edge of the sheet during the rack loading procedure and to contain said sheet edge during the rack-unloading procedure. Said pusher members 18 are arranged so that they can work within compartments 12 or project therefrom, and for this purpose they are mounted on longitudinally extending bars 22, 22. These lever bars 22, 22 are pivoted at 24 and provided with wheels 26, 26 which run on and are guided by the longitudinally extending angle bars 28, 28 which in turn are attached to the ends of roll supporting members 16. The sheet receiving edge 20 is slotted in its lower surface to provide clearance for the pusher member 18 over sheet lifting elements 30 which are mounted on the laterally extending horizontal angle bars 32.

The bars 22, 22 are also connected to an upright pusher bar 34, 34 for simultaneous movement to and fro in the rack by means of the connection of pusher bar 34, 34 with a main carriage 36, 36 which has guide wheels 38 which run on lower and upper tracks 40, 40 in the rack. Said main carriage 36, 36 is actuated by means of the pairs of endless chains 42, 42 which are driven to travel in unison by the sprocket 45 driving chains 44, 44 and 47 from a source of power indicated at 46. Control arrangements (not shown) are provided so that the operator can cause the main carriage 36 to be moved and stopped when desired.

In each of the paired compartments 12, guides 48 are provided for guiding the sheets into the receiving edges 20 and substantially aligning the side edges of the sheets vertically in the rack. These guides 48 are secured to the bar 50 which is slidably attached to the rack frame at 52. The guides 48 may be manually adjusted for the alignment of sheets of various widths.

Each of the cantilever supported rolls 14 terminates, at its centrally disposed end, in a spindle 54 which is inserted into the bearing 56. The bearing 56 is press fit to the housing 58 which contains laterally extending pin members 60, 60. These pin members 60, 60 engage the horizontal slots 62, 62 of the U-shaped bearing housing support 64 and thus prevent the rotation of the bearing assembly during operation of the rolls 14. The bearing elements are assembled as a unit for convenient removal from the rack by means of bolt 65 which carries the washer 66. This washer presses against the bearing 58 and, when the roll 14 is pulled toward the rack frame, causes the entire bearing and housing to be removed therewith.

The outer terminal spindle 68 of each roll 14 is mounted in bearing assembly 70 which is supported by the member 72 attached to the frame of rack 10 by the angle support 74. The roll 14 and its terminal bearing assemblies may be adjusted by means of the nut 76. Each roll 14 also carries, on its outer spindle 68, a sprocket 78 which is driven by means of sprocket driving chains 80 which are driven in unison by the endless chain 82 from a source of power indicated at 84. Thus, all of the rolls 14 rotate in unison.

In charging the rack with blank sheets, it is preferably positioned in front of a stationary rack which has previously been loaded with the blanks. The rolls 14 are set in synchronous motion by means of the sprocket driving chains 80 which are in turn driven by the endless chains 82. The blanks are simultaneously ejected from the stationary rack into the paired compartments 12 of the rack 10 where, after having passed over two or three of the rolls 14, there is sufficient friction generated for the rotating rolls 14 to induce movement of the sheets into the rack. As the blanks pass into the paired compartments 12 on the rotating rolls 14, the leading edges thereof are slightly raised by the sheet lifting elements 30 and the edges are thereby deposited in the U-shaped edge 20. The sheets are in substantial alignment inasmuch as during their passage into the rack they pass between the sheet guides 48 prior to entering the receptacles 20.

The rack containing the load of sheets is then moved along the guide rail 86 until it is in unloading position in front of the press. To load the press, the platens of which are in open position, main carriage 36 is now traveled toward the press end of the rack, and through this action the sheets are pushed by the pusher members 18 out of the rack compartments 12 and into the aligned press platen openings. In the rack-unloading procedure, the rolls 14 are rotated in the direction of the sheet travel and thus assist in unloading the rack. During this operation, the rolls 14 are rotated at a speed slightly less than that of the main carriage 36 to prevent the sheet edges from becoming disengaged from the U-shaped edge 20 of sheet pusher members 18. The carriage 36 is then moved in the opposite direction and the pusher members 18 are thereby withdrawn from the press platen openings so that the press may be closed. The rack is then preferably moved back to its original position where it is in condition to receive a new charge of blank sheets from the stationary loading rack. A second identical movable rack may then be stationed in front of the press for unloading the finished boards therefrom.

As many apparently widely different embodiments of this invention may be made without departing from the spirit and scope thereof, it is to be understood that the invention is not to be limited to the specific embodiments thereof except as defined in the appended claims.

We claim:

1. A self-loading and unloading apparatus for handling a plurality of sheets comprising a rack containing a series of pairs of horizontally extending oppositely opposed compartments providing a central opening extending the height and length of the rack, paired sheet supporting roll members within each compartment, each pair of compartments associated with a sheet pusher member equipped with a substantially U-shaped element extending transversely therethrough across the width of the rack and adapted to receive a sheet edge, fixed sheet-raising members positioned immediately adjacent to the retracted position of said sheet pusher members and adapted to raise the leading edges of the sheets into the U-shaped pusher elements during the loading of said apparatus, said sheet pusher members being mounted on roller supports movable within the limits of the rack and connected to an upright pusher bar attached to a movable main carriage positioned within the rack and movable along the central axis thereof through said central opening, said pusher bar serving to simultaneously actuate the sheet pusher members, and said rack being mounted on means for movement along a guide rail.

2. A self-loading and unloading apparatus for handling a plurality of sheets comprising a rack containing a series of pairs of horizontally extending oppositely opposed compartments providing a central opening extending the height and length of the rack, sheet guiding members in each pair of compartments, paired sheet supporting roll members in each pair of compartments, each pair of compartments associated with a sheet pusher member equipped with a substantially U-shaped element extending therethrough across the width of the rack and adapted to receive a sheet edge, fixed sheet-raising members positioned immediately adjacent to the retracted position of said sheet pusher members and adapted to raise the leading edges of the sheets into the U-shaped pusher elements during the loading of the apparatus, said sheet pusher members being mounted on roller supports movable within the limits of the rack and connected to an upright pusher bar attached to a main carriage positioned within the rack and movable along the central axis thereof through said central opening, said pusher bar serving to simultaneously actuate the sheet pusher members, and said rack being mounted on means for movement along a guide rail.

3. In a movable self-loading and unloading apparatus for handling a plurality of sheets and including a plurality of horizontally disposed sheet-supporting cantilever rolls, the combination of roll supporting means and roll-bearing assembly which consists essentially of roll-supporting members extending from the rack sides parallel to each roll, each roll-supporting member having at its centrally disposed end a vertically extending horizontally slotted substantially U-shaped bearing support member, each roll terminating in a shaft encompassed by an integral bearing and bearing housing unit, said housing unit having a pair of horizontally extending members adapted to slidably coact with said horizontal slots of the bearing support member, and said bearing and bearing housing unit being affixed to said roll shaft so as to be removable therewith from the bearing support member.

4. In a movable self-loading and unloading apparatus for handling a plurality of sheets comprising a rack including a series of horizontally extending supporting means for supporting a plurality of sheets at successive heights in substantial alignment with each other, each supporting means consisting of a plurality of oppositely disposed pairs of synchronously actuated rolls extending from the sides of the rack toward the center but terminating short thereof, the combination of roll-supporting members extending from the rack sides parallel to the rolls, and each roll-supporting member having affixed to its centrally disposed end a vertically extending horizontally slotted substantially U-shaped bearing support member, each roll terminating in a shaft encompassed by an integral bearing and bearing housing unit, said housing having a pair of horizontally extending members adapted to slidably coact with said horizontal slots of the bearing support member.

References Cited in the file of this patent

UNITED STATES PATENTS

| | | |
|---|---|---|
| 915,425 | Gerstkemper | Mar. 16, 1909 |
| 1,376,989 | Woods | May 3, 1921 |
| 1,809,456 | Streeter | June 9, 1931 |
| 2,438,896 | Bowen et al. | Apr. 6, 1948 |
| 2,593,012 | Croston | Apr. 15, 1952 |
| 2,663,434 | Pierce | Dec. 22, 1953 |

FOREIGN PATENTS

| | | |
|---|---|---|
| 433,778 | Great Britain | Aug. 15, 1935 |